(12) United States Patent
Sköld et al.

(10) Patent No.: US 11,503,852 B2
(45) Date of Patent: Nov. 22, 2022

(54) NUTRITIONAL SUPPLEMENTS

(71) Applicant: LAMINARIA GROUP AB, Gothenburg (SE)

(72) Inventors: Olov Sköld, Gothenburg (SE); Anna Ström, Partille (SE); Martin Ahnoff, Gothenburg (SE)

(73) Assignee: LAMINARIA GROUP AB, Gothenburg (SE)

( * ) Notice: Subject to any disclaimer, the term of this patent is extended or adjusted under 35 U.S.C. 154(b) by 136 days.

(21) Appl. No.: 16/096,263

(22) PCT Filed: Apr. 28, 2017

(86) PCT No.: PCT/EP2017/060272
§ 371 (c)(1),
(2) Date: Oct. 24, 2018

(87) PCT Pub. No.: WO2017/186948
PCT Pub. Date: Nov. 2, 2017

(65) Prior Publication Data
US 2019/0142047 A1    May 16, 2019

(30) Foreign Application Priority Data
Apr. 29, 2016    (SE) .................................... 1630098-0

(51) Int. Cl.
*A23L 33/125*    (2016.01)
*A23L 2/38*    (2021.01)
(Continued)

(52) U.S. Cl.
CPC .............. *A23L 33/125* (2016.08); *A23L 2/38* (2013.01); *A23L 2/52* (2013.01); *A23L 29/231* (2016.08);
(Continued)

(58) Field of Classification Search
CPC ...... A23L 33/125; A23L 29/231; A23L 33/16; A23L 29/256; A23V 2200/33;
(Continued)

(56) References Cited

U.S. PATENT DOCUMENTS 2,935,409 A    5/1960    McDowell et al.
5,866,190 A    2/1999    Barey
(Continued)

FOREIGN PATENT DOCUMENTS

DE    29701817        3/1997
EP    2098124 A1    9/2009
(Continued)

OTHER PUBLICATIONS

Mcentee et al., "Tunable Transport of Glucose Through Ionically-Crosslinked Alginate Gels: Effect of Alginate and Calcium Concentration", Journal of Applied Polymer Science, DOI 10.1002/app. 27478, 2007, 2956-2962.

(Continued)

*Primary Examiner* — Katherine D Leblanc
(74) *Attorney, Agent, or Firm* — James S. Keddie; Bozicevic, Field & Francis LLP

(57) ABSTRACT

The present invention provides nutritional supplements comprising alginate, preferably in combination with pectin, which will form hydrogels in the stomach when exposed to the low pH of the gastric juice. The formation of a hydrogel will lead to delayed release of sugars and other active ingredients in the stomach. The nutritional supplements can comprise high concentrations of sugars and complex carbohydrates without causing unwanted gastrointestinal symptoms.

20 Claims, 1 Drawing Sheet

(51) Int. Cl.

| | |
|---|---|
| A23L 2/52 | (2006.01) |
| A23L 29/231 | (2016.01) |
| A23L 29/256 | (2016.01) |
| A23L 29/30 | (2016.01) |
| A23L 33/175 | (2016.01) |
| A23L 33/16 | (2016.01) |
| A23L 33/10 | (2016.01) |

(52) U.S. Cl.
CPC ............ *A23L 29/256* (2016.08); *A23L 29/30* (2016.08); *A23L 33/10* (2016.08); *A23L 33/16* (2016.08); *A23L 33/175* (2016.08); *A23V 2002/00* (2013.01); *A23V 2200/33* (2013.01); *A23V 2250/06* (2013.01); *A23V 2250/16* (2013.01); *A23V 2250/161* (2013.01); *A23V 2250/1614* (2013.01); *A23V 2250/1642* (2013.01); *A23V 2250/5026* (2013.01); *A23V 2250/50722* (2013.01); *A23V 2250/5114* (2013.01); *A23V 2250/5118* (2013.01); *A23V 2250/606* (2013.01); *A23V 2250/61* (2013.01); *A23V 2250/62* (2013.01); *A23V 2250/628* (2013.01)

(58) Field of Classification Search
CPC ............ A23V 2250/06; A23V 2250/16; A23V 2250/161; A23V 2250/1614; A23V 2250/1642; A23V 2250/5026; A23V 2250/50722; A23V 2250/5114

See application file for complete search history.

(56) References Cited

U.S. PATENT DOCUMENTS

| | | | |
|---|---|---|---|
| 5,980,968 | A | 11/1999 | Booth |
| 6,165,503 | A | 12/2000 | Gaserod et al. |
| 2003/0118712 | A1 | 6/2003 | Koren et al. |
| 2005/0170059 | A1* | 8/2005 | Aldred ............... A23L 7/126 426/573 |
| 2007/0082029 | A1 | 4/2007 | Aimutis et al. |
| 2007/0082114 | A1 | 4/2007 | Catani |
| 2009/0155409 | A1 | 6/2009 | Sexton et al. |
| 2011/0195157 | A1 | 8/2011 | Niichel |
| 2014/0037830 | A1 | 2/2014 | Sexton et al. |
| 2015/0118365 | A1 | 4/2015 | Hollenkamp |
| 2016/0143330 | A1 | 5/2016 | Inoue et al. |
| 2018/0000743 | A1 | 1/2018 | Welker et al. |

FOREIGN PATENT DOCUMENTS

| | | |
|---|---|---|
| SE | 512093 | 1/2000 |
| WO | WO 98/20755 A1 | 5/1998 |
| WO | WO 99/56563 A2 | 11/1999 |
| WO | WO 02/094224 | 11/2002 |
| WO | WO 2005/020719 A1 | 3/2005 |
| WO | WO 2007/039294 A2 | 4/2007 |
| WO | WO 2007/044511 A1 | 4/2007 |
| WO | WO 2008/022857 A1 | 2/2008 |
| WO | WO 2011/063817 | 6/2011 |
| WO | WO 2011/071699 A1 | 6/2011 |
| WO | WO 2014/209106 A1 | 12/2014 |

OTHER PUBLICATIONS

"Nutrition and Athletic Performance", American College of Sports Medicine, American Dietetic Association Dietitians of Canada, Official Journal of the American College of Sports Medicine, pp. 709-731.

Khoury et al., "Effect of sodium alginate addition to chocolate milk on glycemia, insulin, appetite and food intake in healthy adult men", European Journal of Clinical Nutrition, 2014, 68: 613-618.

Hoad et al., "Human Nutrition and Metabolism, In Vivo Imaging of Intragastric Gelation and Its Effect on Satiety in Humans", American Society for Nutritional Sciences, 2004, pp. 2293-2300.

Jeukendrup, "Carbohydrate feeding during exercise", European Journal of Sport Science, 2008, 8:2, 77-86, DOI: 10.1080/17461390801918971.

Paxman et al., "Daily ingestion of alginate reduces energy intake in free-living subjects", Appetite, 2008, 51: 713-719.

Pelkman et al., "Novel calcium-gelled, alginate-pectin beverage reduced energy intake in nondieting overweight and obese women: interactions with dietary restraint status", Am J Clin Nutr, 2007, 86:1595-1602.

Pfeiffer et al., "Nutritional Intake and Gastrointestinal Problems during Competitive Endurance Events", Official Journal of the American College of Sports Medicine, pp. 344-351.

International-Type Search Report issued for Swedish Patent Application No. 1630098-0, dated Jun. 12, 2016.

Swedish Search Report issued for Swedish Patent Application No. 1730056-7, dated Sep. 15, 2017.

Msagati, T. A. M. "Microencapsulation and Bioencapsulation" In: Chemistry of Food Additives and Preservatives, West Sussex: John Wiley & Sons, ltd., 2013, p. 295-302, ISBN 978-1-118-27414-9.

Third Party Observation for European patent application No. EP20170720136, dated Jun. 17, 2019.

Third Party Observation for European patent application No. EP20170720136, dated Jun. 26, 2019.

Grant et al., "Biological Interactions Between Polysaccharides and Divalent Cations: The Egg-Box Model", FEBS Letters, 1973, 32(1): 195-198.

Ström et al., "Physico-Chemical Properties of Hydrocolloids Determine Their Appetite Effects", In Gums and stabilizers for the food industry 15, Eds. P. A. Williams, G. O. Phillips, Royal Chemical Society, 2009, pp. 341-355.

Wan et al., "Calcium Concentration Effects on the Mechanical and Biochemical Properties of Chondrocyte-Alginate Constructs", Cell Mol Bioeng., 2008, 1(1): 93-102. doi:10.1007/s12195-008-0014-x.

Barber et al., "Pectin-Alginate Does Not Further Enhance Exogenous Carbohydrate Oxidation in Running", Medicine & Science in Sports & Exercise, 2019, Publish Ahead of Print, DOI: 10.1249/MSS.0000000000002262.

Marciani et al., "Alginate and HM-pectin in sports-drink give rise to intra-gastric gelation in vivo", Food & Function, 2019, 10: 7892.

Oliveira et al., "Carbohydrate-Dependent, Exercise-Induced Gastrointestinal Distress", Nutrients, 2014, 6: 4191-4199.

Rowe et al., "Glucose and Fructose Hydrogel Enhances Running Performance, Exogenous Carbohydrate Oxidation and Gastrointestinal Tolerance", Med Sci Sports Exerc. Jul. 30, 2021. doi: 10.1249/MSS.0000000000002764. Epub ahead of print. PMID: 34334720.

* cited by examiner

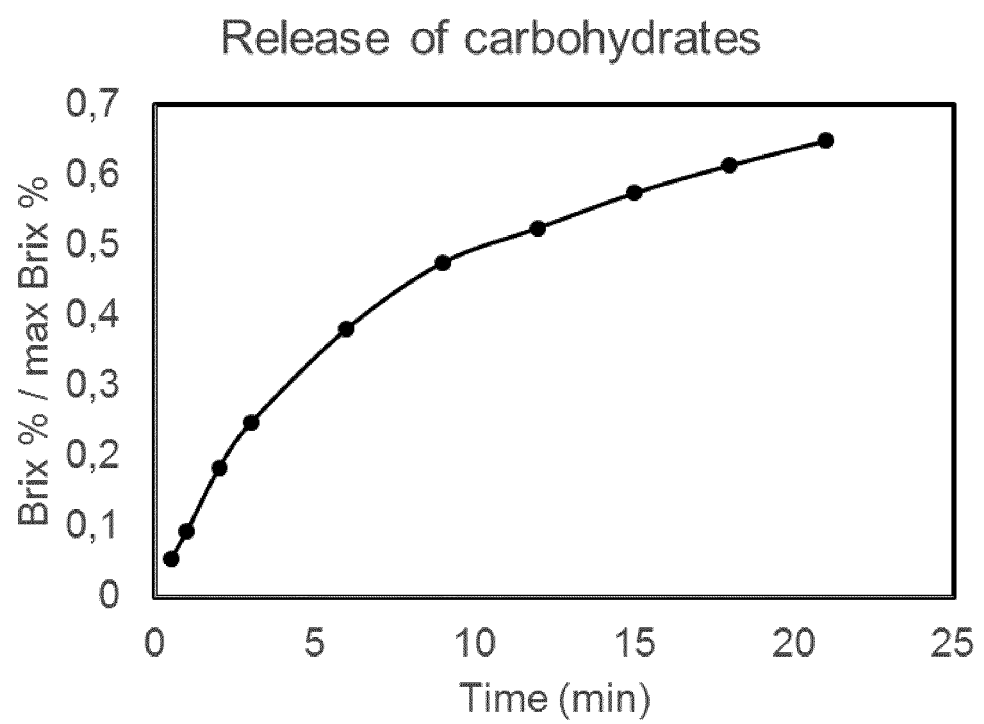

NUTRITIONAL SUPPLEMENTS

CROSS-REFERENCE TO RELATED APPLICATIONS

This application is a § 371 national phase of International Application No. PCT/EP2017/060272, filed on Apr. 28, 2017, which claims the benefit of Swedish Patent Application No. 1630098-0, filed on Apr. 29, 2016, which applications are incorporated by reference herein.

BACKGROUND TO THE INVENTION

Athletes participating in endurance events are required to sustain relatively high work rates for a prolonged period, which results in high sweat rates and energy expenditure. To delay the onset of fatigue and optimize prolonged endurance performance, athletes are recommended to compensate fluid and electrolyte losses as well as to fuel the body with energy from carbohydrates.

Carbohydrate intake has been shown to improve endurance capacity and performance and athletes are advised to consume carbohydrate at rates of 0.7 g $kg^{-1}$ body weight per hour (30-60 g $h^{-1}$) during endurance events (American College of Sports Medicine. Med Sci Sports Exerc. 2009, 41:709-31). An alternative contemporary recommendation suggests even higher carbohydrate intake rates of up to 90 g $h^{-1}$ for athletes competing in intense (ultra)endurance events longer than 2 h (Jeukendrup Eur J Sport Sci 2008, 8:77-86).

High carbohydrate intakes rates are significantly positively correlated with performance, but at the same time, are linked to gastrointestinal symptoms such as higher scores of nausea and flatulence (Pfeiffer Med Sci Sports Exerc 2012, 44:344-351).

Accordingly, there is a demand for carbohydrate containing nutritional supplements that allows high carbohydrate intake without causing unwanted gastrointestinal symptoms.

DESCRIPTION OF THE INVENTION

The present invention solves the problem by providing nutritional supplements comprising alginate, preferably in combination with pectin, which will form hydrogels in the stomach when exposed to the low pH of the gastric juice. The formation of a hydrogel will lead to delayed release of sugars and other active ingredients in the stomach. The nutritional supplements can comprise high concentrations of sugars and complex carbohydrates without causing unwanted gastrointestinal symptoms.

The composition of the nutritional supplements according to the invention are selectively chosen to provide both a low viscosity at consumption in combination with effective gelling when exposed to the low pH of the gastric juice.

The first aspect of the present invention provides liquid nutritional supplements comprising;
  a) 0.1 to 2.0 wt % alginate
  b) 0.1 to 1.5 wt % pectin, and
  c) 35 to 80 wt % active ingredients, where the active ingredients are selected from one or more of the ingredients consisting of sugars, complex carbohydrates, electrolytes, and amino acids,
for use as sport gels or energy gels.

More specifically for providing carbohydrates for energy before, during and/or after exercise avoiding gastrointestinal symptoms, such as flatulence and nausea.

In one preferred embodiment the liquid nutritional supplement consists essentially of;
  a) 0.1 to 2.0 wt % alginate
  b) 0.1 to 1.5 wt % pectin, and
  c) 35 to 80 wt % active ingredients, where the active ingredients are selected from one or more of the ingredients consisting of sugars, complex carbohydrates, electrolytes, and amino acids.

The content of active ingredients can be 35 to 80 wt %, such as 40 to 80 wt %, 50 to 80 wt %, or 50 to 75 wt %.

The alginate content can be 0.1 to 2.0 wt %, such as 0.2 to 1.0 wt %, preferably 0.4 to 0.8 wt %, or 0.3 to 0.7 wt %.

The alginate is preferably high-guluronate (high-G) alginate.

The pectin content can be 0.1 to 1.5 wt %, such as 0.2 to 1.0 wt %, preferably 0.2% to 0.6 wt %, or 0.3 to 0.5 wt %.

The pectin is preferably high-methylated (HM) pectin.

The sugar content can be 35 to 75 wt %, such as 35 to 65 wt %, or 50 to 65 wt %, which can provide sports gels intended to be consumed in volumes from 25 ml to 100 ml, The sugars can be selected from, but are not limited to, glucose, fructose, sucrose and isomaltulose If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise flavouring, such as citrus or vanilla aromas In one preferred embodiment the liquid nutritional supplement comprises,
  a) 0.3 to 0.7 wt % alginate,
  b) 0.3 to 0.5 wt % pectin, and
  c) 50 to 75 wt % active ingredients, consisting of 0 to 35 wt % fructose, 0 to 35 wt % glucose, 0 to 70 wt % sucrose, 0 to 35 wt % maltodextrin, and 0 to 1 wt % sodium chloride.

The second aspect of the present invention provides liquid nutritional supplements comprising;
  a) 0.1 to 2.0 wt % alginate
  b) 0.1 to 1.5 wt % pectin, and
  c) 35 to 80 wt % active ingredients, where the active ingredients are selected from one or more of the ingredients consisting of sugars, complex carbohydrates, electrolytes, and amino acids.

In one preferred embodiment the liquid nutritional supplement consists essentially of;
  a) 0.1 to 2.0 wt % alginate
  b) 0.1 to 1.5 wt % pectin, and
  c) 35 to 80 wt % active ingredients, where the active ingredients are selected from one or more of the ingredients consisting of sugars, complex carbohydrates, electrolytes, and amino acids.

The content of active ingredients can be 35 to 80 wt %, such as 40 to 80 wt %, 50 to 80 wt %, or 50 to 75 wt %.

The alginate content can be 0.1 to 2.0 wt %, such as 0.2 to 1.0 wt %, preferably 0.4 to 0.8 wt %, or 0.3 to 0.7 wt %.

The alginate is preferably high-guluronate (high-G) alginate.

The pectin content can be 0.1 to 1.5 wt %, such as 0.2 to 1.0 wt %, preferably 0.2% to 0.6 wt %, or 0.3 to 0.5 wt %.

The pectin is preferably high-methylated (HM) pectin.

The sugar content can be 50 to 75 wt %, such as 60 to 70 wt %, which can provide sports gels intended to be consumed in volumes from 25 ml to 100 ml.

The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise flavouring, such as citrus or vanilla aromas.

In one preferred embodiment the liquid nutritional supplement consists essentially of,
a) 0.3 to 0.7 wt % alginate,
b) 0.3 to 0.5 wt % pectin, and
c) 50 to 75 wt % active ingredients, consisting of 0 to 35 wt % fructose, 0 to 35 wt % glucose, 0 to 70 wt % sucrose, 0 to 35 wt % maltodextrin, and 0 to 1 wt % sodium chloride.

The third aspect of the present invention provides liquid nutritional supplements comprising;
a) 0.1 to 3.5 wt % alginate, and
b) 50 to 80 wt % active ingredients, where the active ingredients are selected from one or more of the ingredients consisting of sugars, complex carbohydrates, electrolytes, and amino acids,
for use as sport gels or energy gels.

More specifically for providing carbohydrates for energy before, during and/or after exercise avoiding gastrointestinal symptoms, such as flatulence and nausea.

In one preferred embodiment the liquid nutritional supplement consists essentially of;
a) 0.1 to 3.5 wt % alginate, and
b) 35 to 80 wt % active ingredients, where the active ingredients are selected from one or more of the ingredients consisting of sugars, complex carbohydrates, electrolytes, and amino acids.

The content of active ingredients can be 35 to 80 wt %, such as 40 to 80 wt %, 50 to 80 wt %, or 50 to 75 wt %.

The alginate content can be 0.1 to 3.5 wt %, such as 0.3 to 3.5 wt %, 0.3 to 2.0 wt %, or 0.5 to 2.0 wt %, preferably 0.5 to 1.0 wt %, 0.5 to 0.7 wt %, or 0.3 to 0.6 wt %.

The alginate is preferably high-guluronate (high-G) alginate.

The sugar content can be 50% to 75 wt %, such as 60 to 70 wt %, which can provide sports gels intended to be consumed in volumes from 25 ml to 100 ml The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise a flavouring, such as citrus or vanilla aromas.

The fourth aspect of the present invention provides liquid nutritional supplements comprising;
a) 0.1 to 3.5 wt % alginate, and
b) 35 to 80 wt % active ingredients, where the active ingredients are selected from one or more of the ingredients consisting of sugars, complex carbohydrates, electrolytes, and amino acids.

In one preferred embodiment the liquid nutritional supplement consists essentially of;
a) 0.1 to 3.5 wt % alginate, and
b) 35 to 80 wt % active ingredients, where the active ingredients are selected from one or more of the ingredients consisting of sugars, complex carbohydrates, electrolytes, and amino acids.

The content of active ingredients can be 35 to 80 wt %, such as 40 to 80 wt %, 50 to 80 wt %, or 50 to 75 wt %.

The alginate content can be 0.1 to 3.5 wt %, such as 0.3 to 3.5 wt %, 0.3 to 2.0 wt %, or 0.5 to 2.0 wt %, preferably 0.5 to 1.0 wt %, 0.5 to 0.7 wt %, or 0.3 to 0.6 wt %.

The alginate is preferably high-guluronate (high-G) alginate.

The sugar content can be 50% to 75 wt %, such as 60 to 70 wt %, which can provide sports gels intended to be consumed in volumes from 25 ml to 100 ml The sugars can be selected from, but are not limited to, glucose, fructose, sucrose and isomaltulose.

If present the glucose to fructose ratio can be from 10:1 to 1:10, such as 4:1 to 1:1, preferably 2:1.

The complex carbohydrates can be selected from starch, maltodextrin, glucose syrup and fructose syrup.

The content of complex carbohydrates can be 0 to 25 wt %, such as 4 to 9 wt %.

The electrolytes can be selected from chloride, phosphate and citrate salts of sodium potassium, zinc and magnesium.

Optional the nutritional supplements can comprise vitamins, such as vitamin C.

Optionally the nutritional supplements can comprise a flavouring, such as citrus or vanilla aromas.

The liquid nutritional supplements according to the invention can be in the form of sports gels intended to be consumed in volumes from 25 ml to 100 ml.

Another aspect of the present invention provides use of a nutritional supplement according to the invention as sports drinks, energy drinks, beverages or food products.

Another aspect of the present invention provides use of a nutritional supplement according to the invention in the manufacture of sports drinks, energy drinks, beverages or food products.

LEGEND TO THE FIGURE

FIG. 1. Release of carbohydrates from a formulation after gelling in simulated gastric fluid (SGF). BRIX concentrations measured in SGX at different time point after 0.5-21 min given as percentage of BRIX concentrations measured after-24 h.

DETAILED DESCRIPTION OF THE INVENTION

Upon digestion the liquid nutritional supplements comprising pectin and alginate will form a gel in the stomach when exposed to the low pH of gastric juice. The gel formation will lead to slow release of sugars in the stomach (FIG. 1), avoiding unwanted gastrointestinal symptoms.

Pectin

Pectin, also known as pectic polysaccharides, is rich in galacturonic acid. Several distinct polysaccharides have been identified and characterised within the pectic group. Homogalacturonans are linear chains of α-(1-4)-linked D-galacturonic acid. Rhamnogalacturonan I pectins (RG-I) contain a backbone of the repeating disaccharide: →4)-α-

D-galacturonic acid-(1,2)-α-L-rhamnose-(1→. From many of the rhamnose residues, sidechains of various neutral sugars branch off. The neutral sugars are mainly D-galactose, L-arabinose and D-xylose, with the types and proportions of neutral sugars varying with the origin of pectin. Another structural type of pectin is rhamnogalacturonan II (RG-II), which is a less frequent, complex, highly branched polysaccharide. Rhamnogalacturonan II can be classified within the group of substituted galacturonans since the rhamnogalacturonan II backbone is made exclusively of D-galacturonic acid units.

Isolated pectin has a molecular weight of typically 60-150,000 g/mol, varying with origin and extraction conditions.

The carboxyl group of the homogalacturonan is, in nature, highly esterified with methyl groups (typically ~70%). The proportion between methylated and non-methylated carboxyl groups, or the degree of methylation (DM) depends among other aspects on maturity of the plant. Once the homogalacturonan is extracted from the plant, the DM is routinely varied, either increased via dispersion in methanol under acid conditions or decreased via acid, alkali or enzymic treatment. The ratio of esterified to non-esterified galacturonic acid determines the gelation behavior of pectin. Pectin with a high degree of methyl esters (>50%) are denoted high methoxy pectin (HM pectin) or high ester pectin (HE pectin) and those with low methoxy content (<50%) as low methoxy pectin (LM pectin) or low ester pectin (LE pectin).

The non-esterified galacturonic acid units can be either free acids (carboxyl groups) or salts with sodium, potassium, or calcium. The salts of partially esterified pectins are called pectinates, if the degree of esterification is below 5 percent the salts are called pectates, the insoluble acid form, pectic acid. All forms of pectin, including HM-pectin, LM-pectin, and amidated LM-pectin, can be used according to the invention. The preferred pectin is HM-pectin.

Alginates

Alginate, also called algin or alginic acid, is an anionic polysaccharide distributed widely in the cell walls of brown algae. Alginate acid is a linear copolymer with homopolymeric blocks of (1-4)-linked β-D-mannuronate (M) and its C-5 epimer α-L-guluronate (G) residues, respectively, covalently linked together in different sequences or blocks. The monomers can appear in homopolymeric blocks of consecutive G-residues (G-blocks), consecutive M-residues (M-blocks) or alternating M and G residues (MG-blocks). All forms of alginate, including high-G alginate and high-M alginate, can be used according to the invention. The preferred alginate is high-G alginate. The counter ion can e.g. be sodium (sodium-alginate), potassium (potassium-alginate), ammonium (ammonium alginate) or other suitable cations, or mixtures thereof.

Sugars

Sugars that can be used according to invention, but not limited to, are monosaccharides like glucose, fructose, galactose, disaccharides like lactose, maltose, sucrose, lactulose, trehalose, cellobiose.

Complex Carbohydrates

Complex carbohydrates that can be used according to the invention, but not limited to, are components of starch like amylose and amylopectin, maltodextrin, glucose syrup and fructose syrup.

EXAMPLES

Material and Methods

Maltodextrin (35 g), fructose (25 g), sodium alginate (0.105 g), Pectin (0.07 g), and NaCl (1.1 g) were mixed with water (total weight 100 g) in a closed vial by magnetic stirring for 2 h. Release tests were carried out by pouring 15 ml of a mixture into 40 ml of simulated gastric fluid (SGF) in a 60-ml cylindrical container (inner diameter 26 mm, length 120 mm) which was slowly rotated (16 rpm). Samples (0.20 ml) of the SGF were taken at 0.5, 1, 2, 3, 6, 9, 12, 15, 18 and 21 min and after 24 h. Optical density and corresponding BRIX-concentration was measured by an ATAGO PAL-3 refractometer.

Results

The formulation formed a gel in contact with SGF. Carbohydrates were slowly released from the gel (FIG. 1). BRIX concentrations measured after 21 min were 65% of BRIX concentration measured after 24 h (FIG. 1).

The invention claimed is:

1. A liquid nutritional supplement consisting of:
   a) 0.1 to 2.0 wt % alginate
   b) 0.1 to 1.5 wt % pectin,
   c) 35 to 80 wt % active ingredients, where the active ingredients are selected from one or more of the ingredients consisting of sugars and complex carbohydrates,
   d) electrolytes selected from salts of sodium and potassium, and
   e) water;
   wherein the liquid nutritional supplement gels when the alginate is exposed to the low pH of gastric juice.

2. The liquid nutritional supplement according to claim 1, wherein the alginate content is 0.3 to 0.7 wt %.

3. The liquid nutritional supplement according to claim 1, wherein the alginate is high-guluronate (high-G) alginate.

4. The liquid nutritional supplement according to claim 1, wherein the pectin content is 0.2 to 1.0 wt %.

5. The liquid nutritional supplement according to claim 4, wherein the pectin content is 0.2 to 0.6 wt %.

6. The liquid nutritional supplement according to claim 5, wherein the pectin content is 0.3 to 0.5 wt %.

7. The liquid nutritional supplement according to claim 1, wherein the pectin is high-ester (HE) pectin.

8. The liquid nutritional supplement according to claim 1, wherein the sugar content is 60 to 80 wt %.

9. The liquid nutritional supplement according to claim 1, wherein the sugars comprise at least one or more of glucose, fructose, sucrose and isomaltose, and/or wherein the complex carbohydrates comprise at least one or more of starch, maltodextrin, glucose syrup and fructose syrup.

10. The liquid nutritional supplement according to claim 1, wherein the electrolytes comprise at least one or more of chloride, phosphate and citrate salts of sodium and potassium.

11. A liquid nutritional supplement comprising:
   a) 0.1 to 2.0 wt % alginate
   b) 0.1 to 1.5 wt % pectin, and
   c) 35 to 80 wt % active ingredients, where the active ingredients are selected from one or more of the ingredients consisting of sugars, complex carbohydrates, and amino acids;
   with the proviso that the liquid nutritional supplement does not comprise any electrolytes other than salts of sodium and potassium;
   wherein the liquid nutritional supplement gels when the alginate is exposed to the low pH of gastric juice.

12. The liquid nutritional supplement according to claim 11, wherein the alginate, the pectin and the active ingredients are all dissolved in water.

13. The liquid nutritional supplement according to claim 11, further comprising:
   d) electrolytes selected from salts of sodium and potassium.

14. The liquid nutritional supplement according to claim 11, wherein the alginate content is 0.3 to 0.7 wt %.

15. The liquid nutritional supplement according to claim 11, wherein the alginate is high-guluronate (high-G) alginate.

16. The liquid nutritional supplement according to claim 11, wherein the pectin content is 0.2 to 1.0 wt %.

17. The liquid nutritional supplement according to claim 16, wherein the pectin content is 0.2 to 0.6 wt %.

18. The liquid nutritional supplement according to claim 17, wherein the pectin is high-ester (HE) pectin.

19. The liquid nutritional supplement according to claim 11, wherein the sugar content is 60 to 80 wt %.

20. The liquid nutritional supplement according to claim 11, wherein the sugars comprise at least one or more of glucose, fructose, sucrose and isomaltose, and/or wherein the complex carbohydrates comprise at least one or more of starch, maltodextrin, glucose syrup and fructose syrup.

\* \* \* \* \*